No. 898,077. PATENTED SEPT. 8, 1908.
S. C. UNRUH.
SIGN.
APPLICATION FILED MAR. 18, 1908.
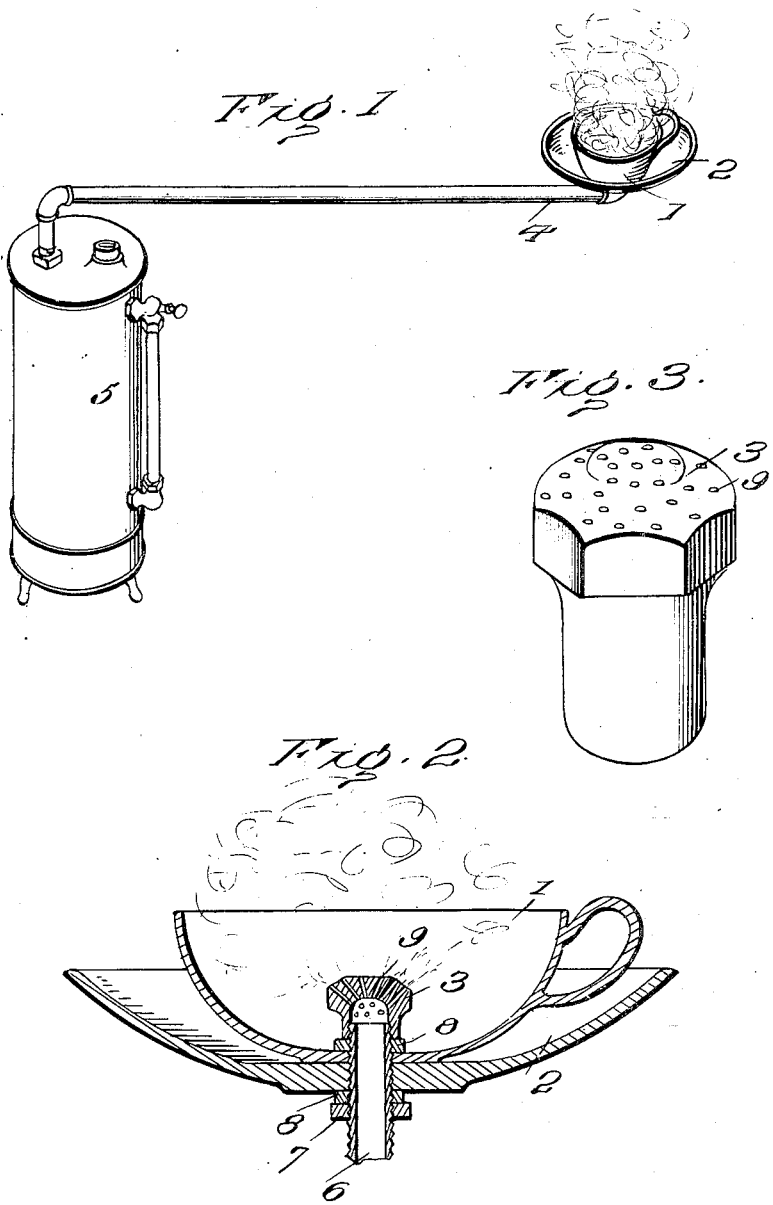
Inventor
S. C. Unruh
Witnesses
By
Attorneys

UNITED STATES PATENT OFFICE.

SCHUYLER C. UNRUH, OF ST. JOSEPH, MICHIGAN.

SIGN.

No. 898,077.  Specification of Letters Patent.  Patented Sept. 8, 1908.

Application filed March 18, 1908. Serial No. 421,878.

*To all whom it may concern:*

Be it known that I, SCHUYLER C. UNRUH, citizen of the United States, residing at St. Joseph, in the county of Berrien and State of Michigan, have invented certain new and useful Improvements in Signs, of which the following is a specification.

The present invention provides means for advertising purposes, being particularly designed for places where beverages are dispensed.

The invention embodies a cup and saucer and means coöperating therewith for causing a vapor to rise, simulating the steam passing off from a hot beverage, such as tea, coffee, cocoa or the like.

For a full understanding of the invention and the merits thereof and also to acquire a knowledge of the details of construction and the means for effecting the result, reference is to be had to the following description and accompanying drawings.

While the invention may be adapted to different forms and conditions by changes within the scope of the appended claims in the structure and minor details without departing from the spirit or essential features thereof, still the preferred embodiment is shown in the accompanying drawings, in which:

Figure 1 is a perspective view of an advertising device embodying the invention, showing the same connected with a steam generator, such as a coffee urn. Fig. 2 is a vertical central section of the cup and saucer, showing the connections. Fig. 3 is a detail perspective view of the combined lock nut and distributer.

Corresponding and like parts are referred to in the following description and indicated in all the views of the drawings by the same reference characters.

The numerals 1 and 2 indicate, respectively, a cup and saucer, which may be of any size, design and construction. Within the lower portion of the cup is arranged a distributer 3 having connection with a steam pipe 4 by means of which steam is supplied thereto from any suitable source, such for instance, as an urn 5, used for heating either water, tea, coffee or the like. A short pipe 6 is passed through registering openings in the bottoms of the cup and saucer and receives the distributer 3 and a lock nut 7. Packing 8 is fitted upon the pipe 6 both between the distributer 3 and cup 1 and the saucer 2 and lock nut 7. The supply pipe 4 is coupled to the lower end of the pipe 6. The distributer 3 also serves as a lock 9 and between it and the nut 7 the parts 1 and 2 are clamped.

The distributer 3 consists of a hollow head having a stem which is threaded to make screw thread connection with the upper end of the pipe 6. The upper end of the space within the distributer is made rounding and minute openings or passages 9 extend therefrom through the top of the distributer to deliver the steam in minute jets so that said steam rising will create the impression of vapor given off by a hot beverage contained within the cup.

The cup and saucer may be of any material and may be displayed in front of a place of business or in any manner to attract attention and direct the public to the place where hot drinks may be obtained.

Having thus described the invention, what is claimed as new is:

1. A sign for advertising hot drinks, the same consisting of a cup and saucer, a pipe passed through openings in the bottoms of said cup and saucer and having connection at its lower end with a source of steam supply, a distributer fitted to the upper end of said pipe and arranged within the lower portion of the cup, and a lock nut threaded upon the lower end of said pipe and coöperating with the said distributer to secure the cup and saucer.

2. The herein described sign for advertising hot drinks, the same consisting of a cup and saucer having openings in their bottoms, a pipe passed through said openings, a distributer fitted to the upper end of the pipe and consisting of a hollow head and a stem, the upper portion of the space of the hollow head being rounded and having minute openings leading therefrom through the top and sides of the distributer, a lock nut fitted to the lower end of said pipe and coöperating with the distributer to clamp the cup and saucer, and packing mounted upon the pipe between the distributer and cup and between the lock nut and saucer.

In testimony whereof I affix my signature in presence of two witnesses.

SCHUYLER C. UNRUH. [L. S.]

Witnesses:
N. A. HAMILTON,
LAWRENCE C. FYFE.